(12) United States Patent
Anderson

(10) Patent No.: US 11,685,200 B2
(45) Date of Patent: Jun. 27, 2023

(54) AUTOMATED TIRE CHAINING ASSEMBLY

(71) Applicant: Dale Anderson, Castlegar (CA)

(72) Inventor: Dale Anderson, Castlegar (CA)

(*) Notice: Subject to any disclaimer, the term of this patent is extended or adjusted under 35 U.S.C. 154(b) by 491 days.

(21) Appl. No.: 16/908,065

(22) Filed: Jun. 22, 2020

(65) Prior Publication Data

US 2021/0394568 A1 Dec. 23, 2021

(51) Int. Cl.
*B60C 27/14* (2006.01)

(52) U.S. Cl.
CPC ............ *B60C 27/145* (2013.01); *B60C 27/14* (2013.01)

(58) Field of Classification Search
CPC .............................. B60C 27/14; B60C 27/145
See application file for complete search history.

(56) References Cited

U.S. PATENT DOCUMENTS

| | | | | |
|---|---|---|---|---|
| 1,355,372 A * | 10/1920 | Weston | ................ | B60C 27/145 152/215 |
| 1,630,111 A * | 5/1927 | Cronenweth | ......... | B60C 27/145 152/215 |
| 1,757,851 A * | 5/1930 | Legg | ..................... | B60C 27/145 152/215 |
| 1,763,906 A * | 6/1930 | Small | ................... | B60C 27/145 152/215 |
| 1,862,378 A * | 6/1932 | Howard | ................ | B60C 27/145 152/215 |
| 1,951,761 A | 3/1934 | Legg | | |
| 1,981,291 A | 11/1934 | Thomas | | |
| 2,351,601 A * | 6/1944 | Dabbs | ................... | B60C 27/145 152/214 |
| 3,111,974 A * | 11/1963 | Rice | ...................... | B60C 27/145 152/214 |
| 4,338,988 A | 7/1982 | Brooks | | |
| D286,524 S | 11/1986 | Hardmark | | |
| 4,809,797 A | 3/1989 | Guyot | | |
| 5,076,379 A | 12/1991 | Bahr | | |
| 9,731,553 B2 | 8/2017 | McKenna | | |
| 2011/0146866 A1 | 6/2011 | Jafari Valilou | | |

FOREIGN PATENT DOCUMENTS

JP 62018308 A * 1/1987 ........... B60C 27/145

* cited by examiner

*Primary Examiner* — Jason R Bellinger

(57) ABSTRACT

A automated tire chaining assembly includes a housing that is positioned above a respective one of a plurality of tires on a vehicle. A chain is formed into a closed loop and the chain extending through each of an entry and an exit of the housing. The chain is positionable in a deployed position having the chain being dropped downwardly around the respective tire to enhance traction of the tire on a slippery surface. A deploying unit is movably attached to the housing and the deploying unit engages the chain. The deploying unit urges the chain between the stored position and the deployed position. Additionally, the chain extends in front of the respective tire when the deploying unit urges the chain into the deployed position thereby facilitating the respective tire to roll over the chain.

12 Claims, 7 Drawing Sheets

AUTOMATED TIRE CHAINING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to tire chaining devices and more particularly pertains to a new tire chaining device for automatically deploying a chain around a tire on a vehicle.

(2) Description of Related Art Including Information Disclosed Under 37 CFR 1.97 and 1.98

The prior art relates to tire chaining devices including a device for assisting a user to wrap a chain around a tire. The prior art also discloses a variety of mechanisms for automatically wrapping, and unwrapping, tire chains around a tire on a vehicle. In each instance a conventional set of tire chains is wrapped around or unwrapped from the tire. Moreover, in each instance a variety of mechanisms is disclosed, including an armature that is axially oriented with respect to a vehicle tire, a rack and pinion gear system, and a spring loaded member for automatically wrapping tire chains around a tire. In no instance in the prior art is a single chain, formed into a closed loop, disclosed over which a tire on a vehicle can roll.

BRIEF SUMMARY OF THE INVENTION

An embodiment of the disclosure meets the needs presented above by generally comprising a housing that is positioned above a respective one of a plurality of tires on a vehicle. A chain is formed into a closed loop and the chain extending through each of an entry and an exit of the housing. The chain is positionable in a deployed position having the chain being dropped downwardly around the respective tire to enhance traction of the tire on a slippery surface. A deploying unit is movably attached to the housing and the deploying unit engages the chain. The deploying unit urges the chain between the stored position and the deployed position. Additionally, the chain extends in front of the respective tire when the deploying unit urges the chain into the deployed position thereby facilitating the respective tire to roll over the chain.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
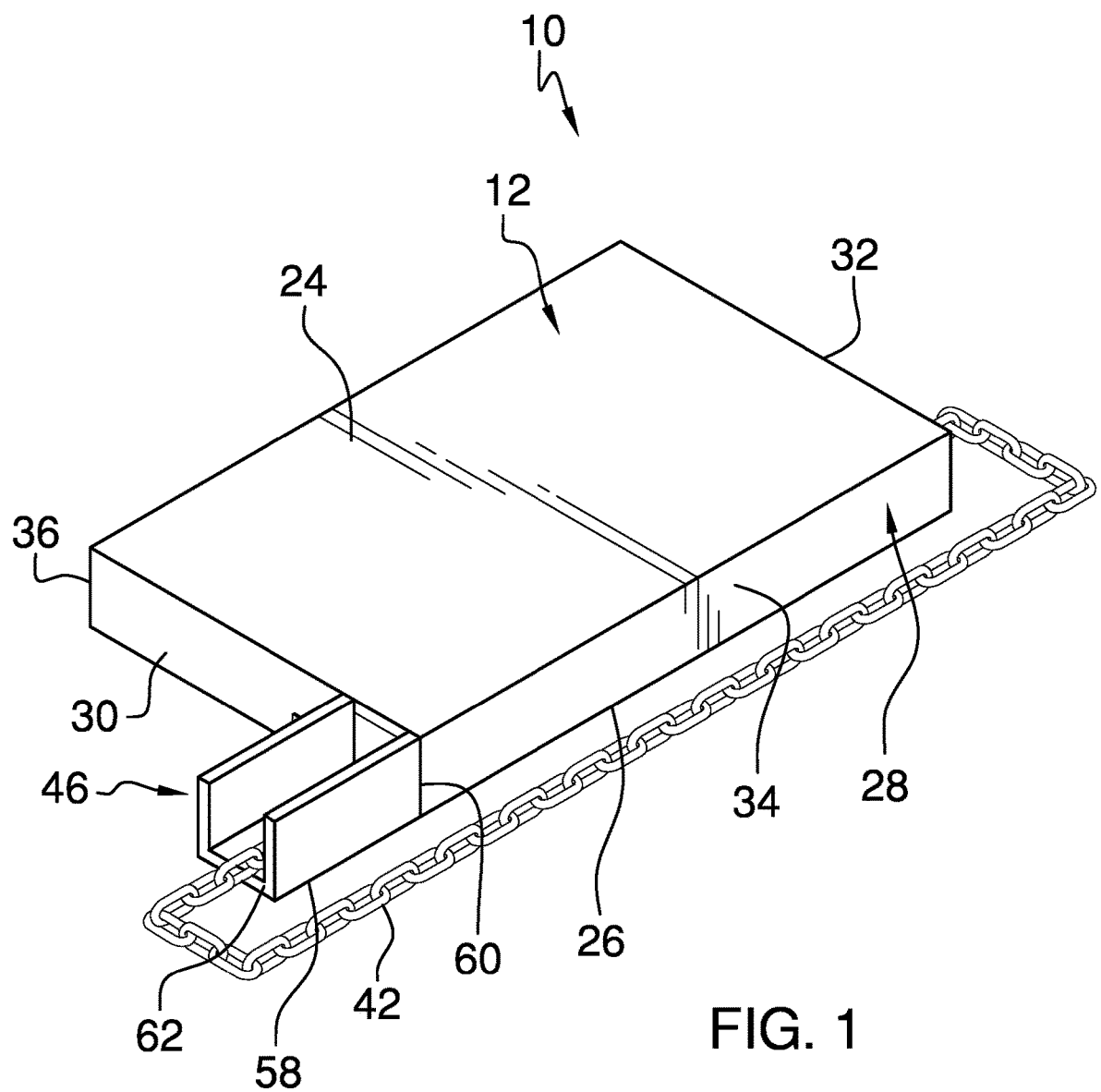
FIG. 1 is a perspective view of a automated tire chaining assembly according to an embodiment of the disclosure.
Figure 2:
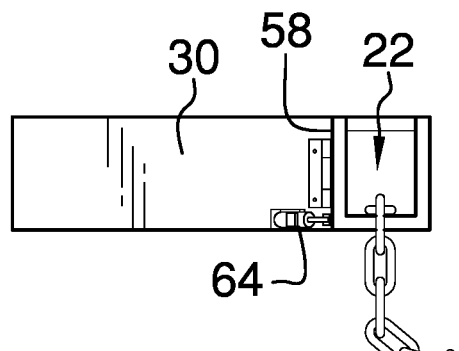
FIG. 2 is a front view of an embodiment of the disclosure.
Figure 3:
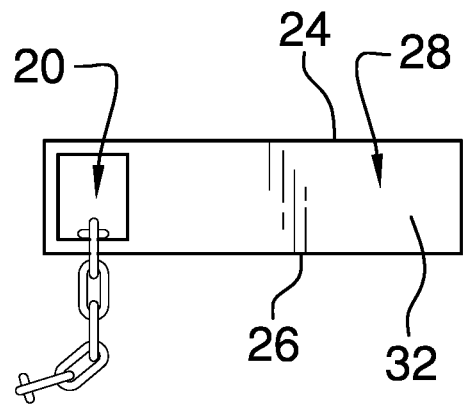
FIG. 3 is a back view of an embodiment of the disclosure.
Figure 4:
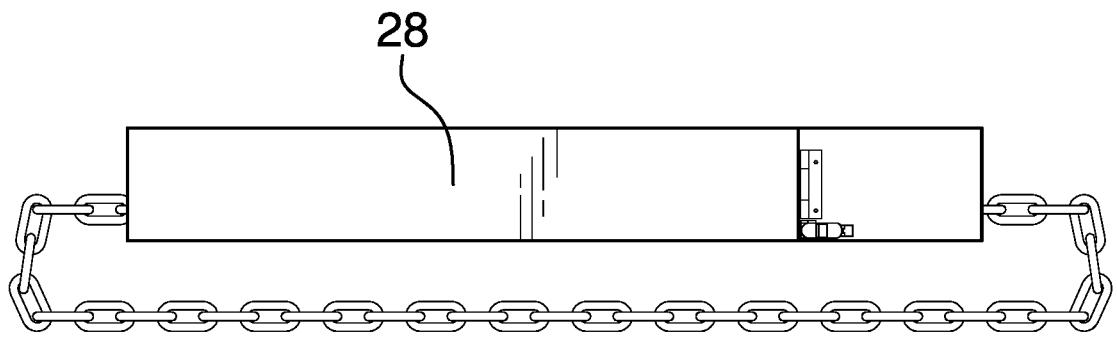
FIG. 4 is a right side view of an embodiment of the disclosure.
Figure 5:
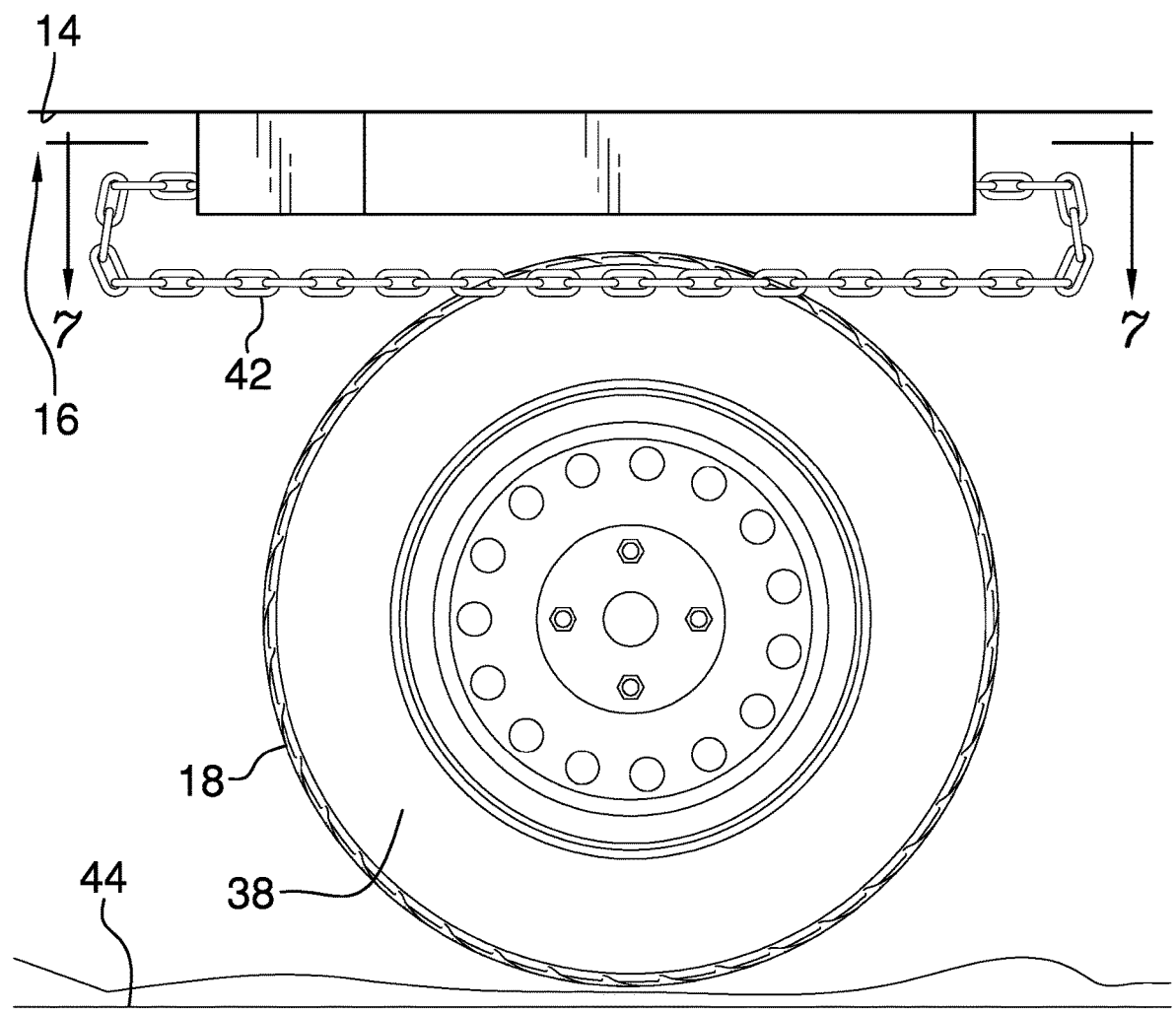
FIG. 5 is a perspective in-use view of an embodiment of the disclosure showing a chain in a stored position.
Figure 6:
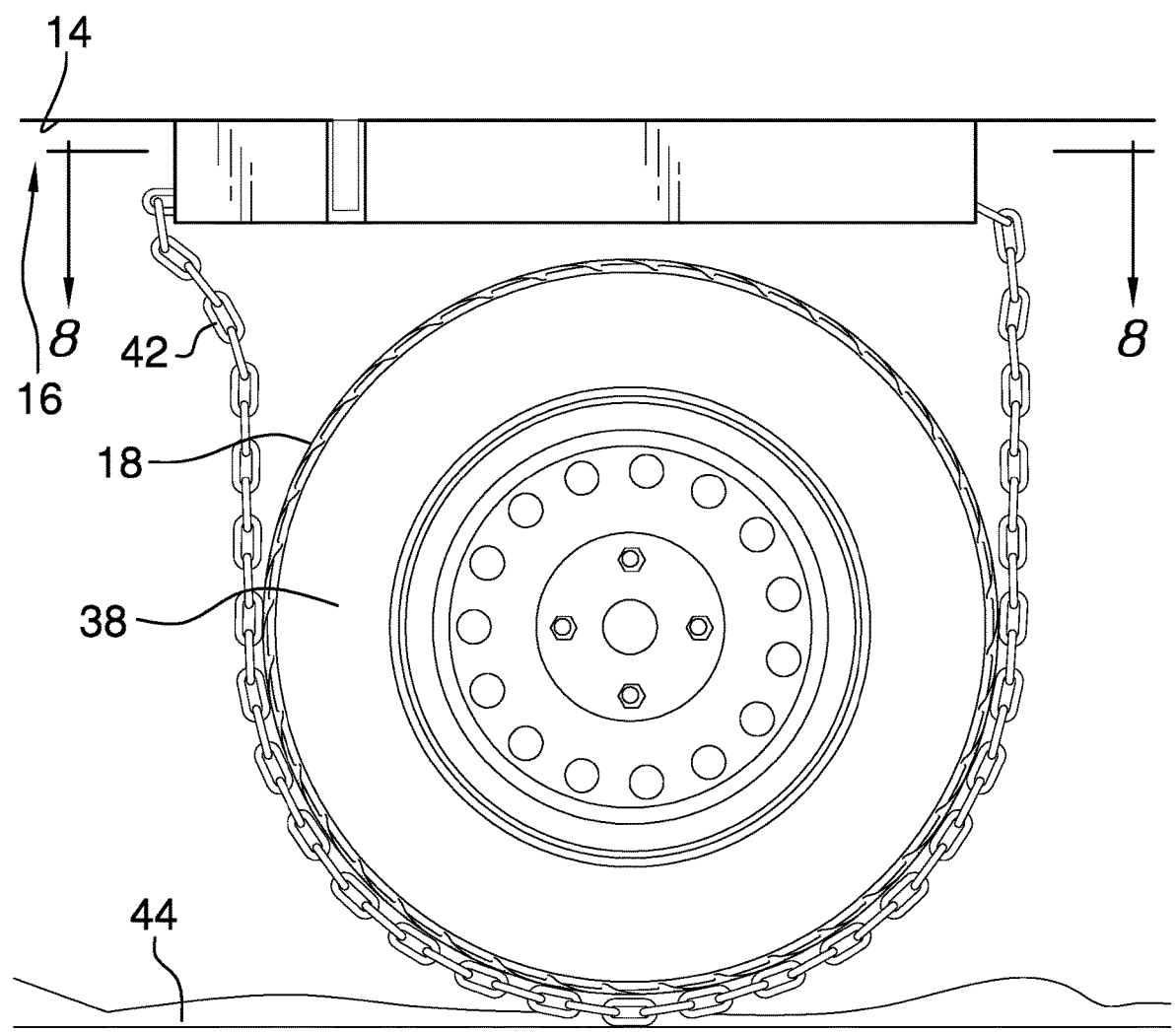
FIG. 6 is a perspective in-use view of an embodiment of the disclosure showing a chain in a deployed position.
Figure 7:
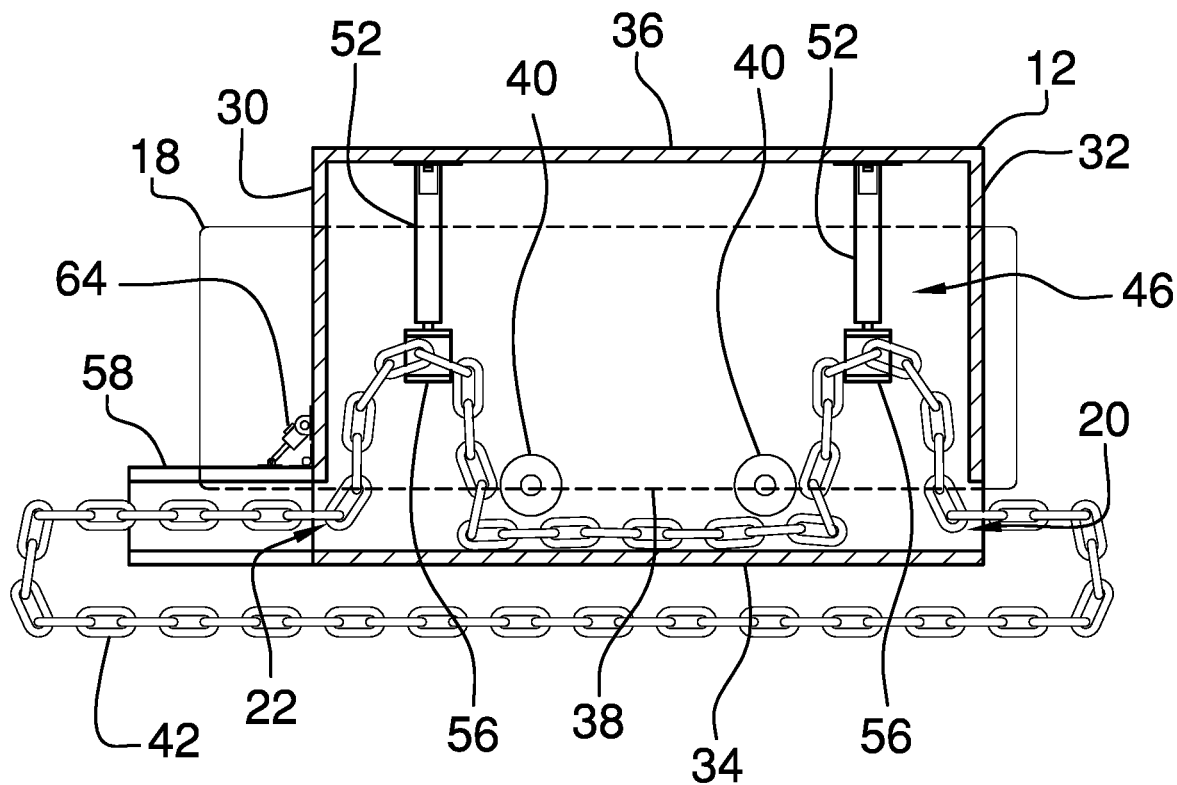
FIG. 7 is a cross sectional view taken along line 7-7 of FIG. 5 of an embodiment of the disclosure.
Figure 8:
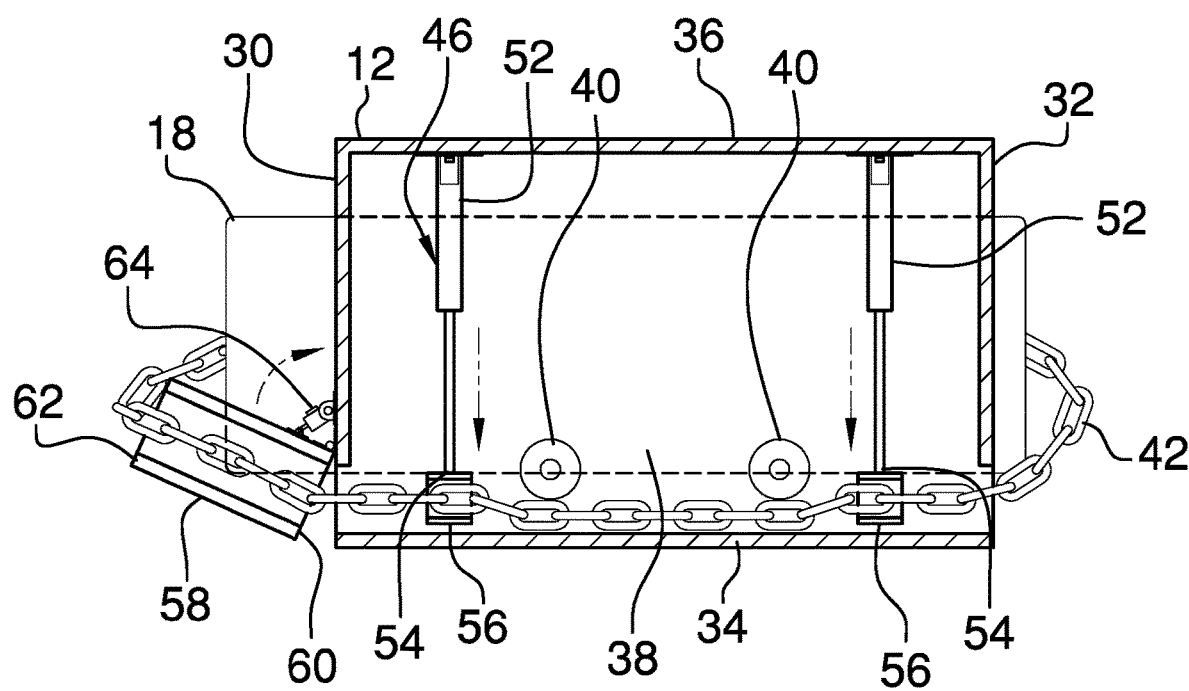
FIG. 8 is a cross sectional view taken along line 8-8 of FIG. 6 of an embodiment of the disclosure.
Figure 9:
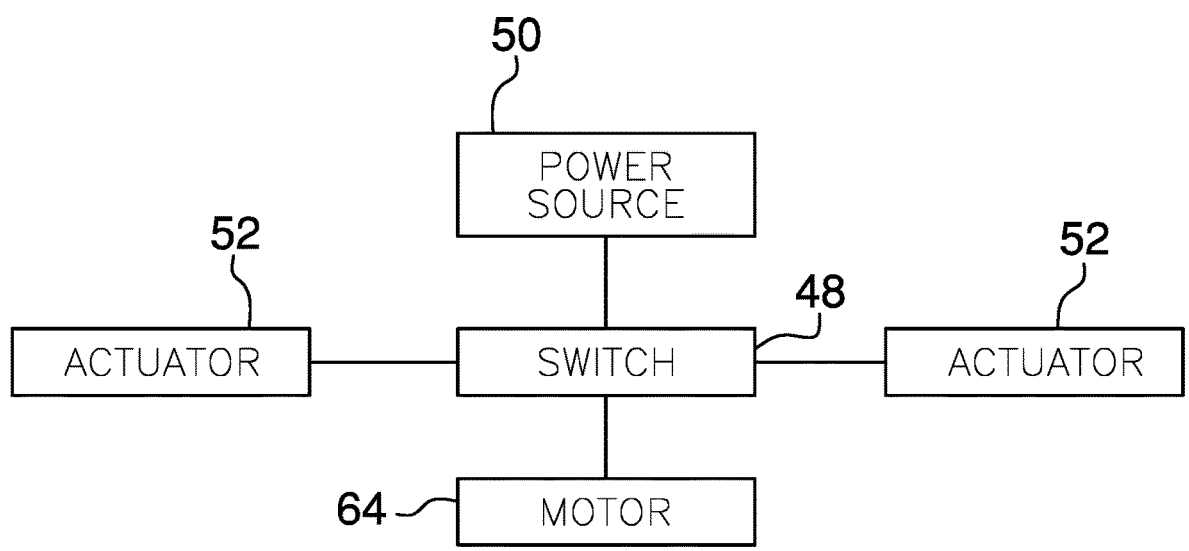
FIG. 9 is a schematic view of an embodiment of the disclosure.

With reference now to the drawings, and in particular to FIGS. 1 through 9 thereof, a new tire chaining device embodying the principles and concepts of an embodiment of the disclosure and generally designated by the reference numeral 10 will be described.

As best illustrated in FIGS. 1 through 9, the automated tire chaining assembly 10 generally comprises a housing 12 that is attached to a lower side 14 of a vehicle 16 having the housing 12 being positioned above a respective one of a plurality of tires 18 on the vehicle 16. The vehicle 16 may be a cargo vehicle, such as a semi tractor or the like, or any other motorized vehicle that is driven on public roadways. The housing 12 has an entry 20 and an exit 22, and the housing 12 has a top wall 24, a bottom wall 26 and an outer wall 28 extending therebetween. The outer wall 28 has a front side 30, a back side 32, a first lateral side 34 and a second lateral side 36.

The top wall 24 is attached to the lower side 14 of the vehicle 16 such that the first lateral side 34 is positioned outwardly beyond an outer sidewall 38 of the respective tire 18. The entry 20 extends through the back side 32 of the outer wall 28 and the exit 22 extends through the front side 30 of the outer wall 28. The entry 20 is aligned with an intersection between the back side 32 and the first lateral side 34. Additionally, the exit 22 is aligned with an intersection between the front side 30 and the first lateral side 34.

A pair of rollers 40 is provided and each of the rollers 40 is rotatably positioned within the housing 12. Each of the rollers 40 rotates about an axis extending through the top wall 24 and the bottom wall 26 of the housing 12. Each of the rollers 40 is spaced from the first lateral side 34 of the outer wall 28. Additionally, each of rollers 40 is positioned adjacent to a respective one of the front side 30 and the back side 32 of the outer wall 28.

A chain 42 is provided and the chain 42 is formed into a closed loop. The chain 42 extends through each of the entry 20 and the exit 22 of the housing 12. The chain 42 is positionable in a stored position having the chain 42 being retained above the respective tire 18. Conversely, the chain 42 is positionable in a deployed position having the chain 42 being dropped downwardly around the respective tire 18. In this way the chain 42 enhances traction of the tire 18 on a slippery surface 44, such as an icy road or the like. The chain 42 may comprise a steel chain similar in size and construction to tire chains commonly employed on cargo vehicles. The chain 42 extends between each of the rollers 40 and the first lateral side 34 of the outer wall 28 of the housing 12. Moreover, the chain 42 travels inwardly through the entry 20 and outwardly through the exit 22 when the tire 18 rolls along the chain 42.

A deploying unit 46 is provided, the deploying unit 46 is movably attached to the housing 12 and the deploying unit 46 engages the chain 42. The deploying unit 46 draws the chain 42 into the stored position when the deploying unit 46 is actuated into a retracting position. Conversely, the deploying unit 46 releases the chain 42 to drop downwardly around the respective tire 18 when the deploying unit 46 is actuated into a deploying position. The deploying unit 46 urges the chain 42 to extend in front of the respective tire 18 when the deploying unit 46 is actuated into the deploying position. In this way the respective tire 18 can roll over the chain 42. Additionally, the deploying unit 46 urges the chain 42 outwardly beyond the respective tire 18 when the deploying unit 46 is actuated into the retracting position. In this way the chain 42 can be drawn upwardly from the respective tire 18.

The deploying unit 46 comprises a switch 48 that is positioned within a cab of the vehicle 16 such that the switch 48 is accessible to a driver. The switch 48 is electrically coupled to a power source 50 comprising an electrical system of the vehicle 16. The deploying unit 46 includes a pair of actuators 52 that is each positioned within the housing 12. Each of the actuators 52 extends from the second lateral side 36 of the outer wall 28 of the housing 12 toward the first lateral side 34 of the outer wall 28 of the housing 12.

Each of the actuators 52 has a distal end 54 with respect to the second lateral side 36. The distal end 54 of each of the actuators 52 is retracted toward the second lateral side 36 when the actuators 52 are turned off. Conversely, the distal end 54 of each of the actuators 52 is extended toward the first lateral side 34 when the actuators 52 are turned on. Each of the actuators 52 is electrically coupled to the switch 48 for turning the actuators 52 on and off. Additionally, each of the actuators 52 may comprise an electronic linear actuator or other similar device that can travel along a straight line.

The deploying unit 46 includes a pair of channels 56 that is each coupled to the distal end 54 of a respective one of the actuators 52 and the chain 42 extends through each of the channels 56. Each of the channels 56 draws the chain 42 into the housing 12 when the actuators 52 are turned off. Conversely, each of the channels 56 facilitates the chain 42 to drop downwardly from the housing 12 when the actuators 52 are turned on. As is most clearly shown in FIG. 8, each of the channels 56 is positioned between the rollers 40 and the first lateral side 34 of the outer wall 28 of the housing 12 when the actuators 52 are turned on. As is most clearly shown in FIG. 7, each of the channels 56 is positioned between the rollers 40 and the second lateral side 36 of the outer wall 28 of the housing 12 when the actuators 52 are turned off. The chain 56 travels through the channels 56 along an axis being oriented parallel to a line extending through the entry 20 and the exit 22.

The deploying unit 46 includes a chute 58 that has a first end 60 and a second end 62, and the first end 60 is pivotally coupled to the front side 30 of the outer wall 28 of the housing 12. The first end 60 is aligned with the exit 22 in the housing 12 such that the chain 42 extends through the chute 58. As is most clearly shown in FIG. 7, the chute 58 is positionable in a first position having the chute 58 extending along a line is oriented perpendicular to the front side 30. In this way the chain 42 is positioned outwardly from the outer sidewall 38 of the respective tire 18 thereby facilitating the actuators 52 to draw the chain 42 into the housing 12. As is most clearly shown in FIG. 8, The chute 58 is positionable in a second position having the chute 58 extending along a line forming an acute angle with the front side 30. In this way the chain 42 is directed to extend downwardly in front of the respective tire 18 thereby facilitating the respective tire 18 to drive over the chain 42.

The deploying unit 46 includes a motor 64 that is coupled to the housing 12 and the motor 64 is in mechanical communication with the chute 58. The motor 64 moves into a home position when the motor 64 is turned off and the motor 64 moves into a deploying position when the motor 64 is turned on. The motor 64 urges the chute 58 into the first position when the motor 64 moves into the home position. Conversely, the motor 64 urges the chute 58 into the second position when the motor 64 moves into the deploying position. The motor 64 is electrically coupled to the switch 48 for turning the motor 64 on and off, and the motor 64 may comprise an electric motor or the like.

In use, the driver turns the switch 48 on when the driver is approaching a slippery area of a road on which the vehicle 16 is driving. Thus, the chain 42 is lowered downwardly from the housing 12 and the chain 42 is urged to extend in front of the respective tire 18. In this way the respective tire 18 can drive over the chain 42 for enhancing traction on the slippery area of the road. The driver turns the switch 48 off when the vehicle 16 leaves the slippery area of the road. Thus, the chain 42 is urged outwardly beyond the respective tire 18 to facilitate the respective tire 18 to roll off of the chain 42, thereby facilitating the chain 42 to be drawn upwardly over the respective tire 18. In this way the driver does not have to stop the vehicle 16 and manually install chains on the tires for driving in slippery conditions.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An automated tire chaining assembly for automatically deploying a chain around a tire of a vehicle for improving traction, said assembly comprising:
    a housing being attached to a lower side of a vehicle having said housing being positioned above a respective one of a plurality of tires on the vehicle, said housing having an entry and an exit;
    a chain being formed into a closed loop, said chain extending through each of said entry and said exit of said housing, said chain being positionable in a stored position having said chain being retained above the respective tire, said chain being positionable in a deployed position having said chain being dropped downwardly around the respective tire wherein said chain is configured to enhance traction of the tire on a slippery surface; and
    a deploying unit being movably attached to said housing, said deploying unit engaging said chain, said deploying unit drawing said chain into said stored position when said deploying unit is actuated into a retracting position, said deploying unit releasing said chain to drop downwardly around the respective tire when said deploying unit is actuated into a deploying position, said deploying unit urging said chain to extend in front of the respective tire when said deploying unit is actuated into said deploying position thereby facilitating the respective tire to roll over said chain, said deploying unit urging said chain outwardly beyond the respective tire when said deploying unit is actuated into said retracting position thereby facilitating said chain to be drawn upwardly from the respective tire.

2. The assembly according to claim 1, wherein said housing has a top wall, a bottom wall and an outer wall extending therebetween, said outer wall having a front side, a back side, a first lateral side and a second lateral side, said top wall being attached to the lower side of the vehicle having said first lateral side being positioned outwardly beyond an outer sidewall of the respective tire, said entry extending through said back side of said outer wall, said exit extending through said front side of said outer wall, entry being aligned with an intersection between said back side and said first lateral side, said exit being aligned with an intersection between said front side and said first lateral side.

3. The assembly according to claim 2, further comprising a pair of rollers, each of said rollers being rotatably positioned within said housing, each of said rollers rotating about an axis extending through said top wall and said bottom wall of said housing, each of said rollers being spaced from said first lateral side of said outer wall, each of said rollers being positioned adjacent to a respective one of said front side and said back side of said outer wall.

4. The assembly according to claim 3, wherein said chain extends between each of said rollers and said first lateral side of said outer wall of said housing, said chain travelling inwardly through said entry and outwardly through said exit when the tire rolls along said chain.

5. The assembly according to claim 1, wherein said deploying unit comprises a switch being positioned within a cab of the vehicle wherein said switch is configured to be accessible to a driver, said switch being electrically coupled to a power source comprising an electrical system of the vehicle.

6. The assembly according to claim 3, wherein said deploying unit includes a pair of actuators, each of said actuators being positioned within said housing, each of said actuators extending from said second lateral side of said outer wall of said housing toward said first lateral side of said outer wall of said housing, each of said actuators having a distal end with respect to said second lateral side, said distal end of each of said actuators being retracted toward said second lateral side when said actuators are turned off, said distal end of each of said actuators being extended toward said first lateral side when said actuators are turned on.

7. The assembly according to claim 6, wherein said deploying unit includes a pair of channels, each of said channels being coupled to said distal end of a respective one of said actuators, said chain extending through each of said channels, each of said channels drawing said chain into said housing when said actuators are turned off, each of said channels facilitating said chain to drop downwardly from said housing when said actuators are turned on, each of said channels being positioned between said rollers and said first lateral wall of said outer wall of said housing when said actuators are turned on, each of said channels being positioned between said rollers and said second lateral side of said outer wall of said housing when said actuators are turned off.

8. The assembly according to claim 2, wherein said deploying unit includes a chute having a first end and a second end, said first end being pivotally coupled to said front side of said outer wall of said housing, said first end being aligned with said exit in said housing such that said chain extends through said chute.

9. The assembly according to claim 8, wherein said chute is positionable in a first position having said chute extending along a line being oriented perpendicular to said front side such that said chain is positioned outwardly from the outer side wall of the respective tire thereby facilitating said actuators to draw said chain into said housing.

10. The assembly according to claim 9, wherein said chute is positionable in a second position having said chute extending along a line forming an acute angle with said front side such that said chain is directed to extend downwardly in front of the respective tire thereby facilitating the respective tire to drive over said chain.

11. The assembly according to claim 10, wherein said deploying unit includes a motor being coupled to said housing, said motor being in mechanical communication with said chute, said motor moving into a home position when said motor is turned off, said motor moving into a deploying position when said motor is turned on, said motor urging said chute into said first position when said motor moves into said home position, said motor urging said chute into said second position when said motor moves into said deploying position, said motor being electrically coupled to said switch for turning said motor on and off.

12. An automated tire chaining assembly for automatically deploying a chain around a tire of a vehicle for improving traction, said assembly comprising:
- a housing being attached to a lower side of a vehicle having said housing being positioned above a respective one of a plurality of tires on the vehicle, said housing having an entry and an exit, said housing having a top wall, a bottom wall and an outer wall extending therebetween, said outer wall having a front side, a back side, a first lateral side and a second lateral side, said top wall being attached to the lower side of the vehicle having said first lateral side being positioned outwardly beyond an outer sidewall of the respective tire, said entry extending through said back side of said outer wall, said exit extending through said front side of said outer wall, said entry being aligned with an intersection between said back side and said first lateral side, said exit being aligned with an intersection between said front side and said first lateral side;
- a pair of rollers, each of said rollers being rotatably positioned within said housing, each of said rollers rotating about an axis extending through said top wall and said bottom wall of said housing, each of said rollers being spaced from said first lateral side of said outer wall, each of rollers being positioned adjacent to a respective one of said front side and said back side of said outer wall;
- a chain being formed into a closed loop, said chain extending through each of said entry and said exit of said housing, said chain being positionable in a stored position having said chain being retained above the respective tire, said chain being positionable in a deployed position having said chain being dropped downwardly around the respective tire wherein said chain is configured to enhance traction of the tire on a slippery surface, said chain extending between each of said rollers and said first lateral side of said outer wall of said housing, said chain travelling inwardly through said entry and outwardly through said exit when the tire rolls along said chain;
- a deploying unit being movably attached to said housing, said deploying unit engaging said chain, said deploying unit drawing said chain into said stored position when said deploying unit is actuated into a retracting position, said deploying unit releasing said chain to drop downwardly around the respective tire when said deploying unit is actuated into a deploying position, said deploying unit urging said chain to extend in front of the respective tire when said deploying unit is actuated into said deploying position thereby facilitating the respective tire to roll over said chain, said deploying unit urging said chain outwardly beyond the respective tire when said deploying unit is actuated into said retracting position thereby facilitating said chain to be drawn upwardly from the respective tire, said deploying unit comprising:
    - a switch being positioned within a cab of the vehicle wherein said switch is configured to be accessible to a driver, said switch being electrically coupled to a power source comprising an electrical system of the vehicle;
    - a pair of actuators, each of said actuators being positioned within said housing, each of said actuators extending from said second lateral side of said outer wall of said housing toward said first lateral side of said outer wall of said housing, each of said actuators having a distal end with respect to said second lateral side, said distal end of each of said actuators being retracted toward said second lateral side when said actuators are turned off, said distal end of each of said actuators being extended toward said first lateral side when said actuators are turned on, each of said actuators being electrically coupled to said switch for turning said actuators on and off;
    - a pair of channels, each of said channels being coupled to said distal end of a respective one of said actuators, said chain extending through each of said channels, each of said channels drawing said chain into said housing when said actuators are turned off, each of said channels facilitating said chain to drop downwardly from said housing when said actuators are turned on, each of said channels being positioned between said rollers and said first lateral wall of said outer wall of said housing when said actuators are turned on, each of said channels being positioned between said rollers and said second lateral side of said outer wall of said housing when said actuators are turned off;
    - a chute having a first end and a second end, said first end being pivotally coupled to said front side of said outer wall of said housing, said first end being aligned with said exit in said housing such that said chain extends through said chute, said chute being positionable in a first position having said chute extending along a line being oriented perpendicular to said front side such that said chain is positioned outwardly from the outer side wall of the respective tire thereby facilitating said actuators to draw said chain into said housing, said chute being positionable in a second position having said chute extending along a line forming an acute angle with said front side such that said chain is directed to extend downwardly in front of the respective tire thereby facilitating the respective tire to drive over said chain; and
    - a motor being coupled to said housing, said motor being in mechanical communication with said chute, said motor moving into a home position when said motor is turned off, said motor moving into a deploying position when said motor is turned on, said motor urging said chute into said first position when said motor moves into said home position, said motor urging said chute into said second position when said motor moves into said deploying position, said motor being electrically coupled to said switch for turning said motor on and off.

\* \* \* \* \*